United States Patent
Ye et al.

(10) Patent No.: US 10,719,953 B1
(45) Date of Patent: Jul. 21, 2020

(54) PASSIVE OBJECT TRACKING USING CAMERA

(71) Applicant: Facebook Technologies, LLC, Menlo Park, CA (US)

(72) Inventors: Yuting Ye, Redmond, WA (US); Robert Y. Wang, Kirkland, WA (US); Christopher David Twigg, San Francisco, CA (US); Shangchen Han, Kirkland, WA (US); Po-Chen Wu, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 164 days.

(21) Appl. No.: 15/937,766

(22) Filed: Mar. 27, 2018

(51) Int. Cl.
  *G06K 9/00* (2006.01)
  *G06T 7/73* (2017.01)
  *G06F 3/0354* (2013.01)

(52) U.S. Cl.
  CPC ............ *G06T 7/73* (2017.01); *G06F 3/03545* (2013.01); *G06T 2207/10016* (2013.01); *G06T 2207/30204* (2013.01)

(58) Field of Classification Search
  None
  See application file for complete search history.

(56) References Cited

U.S. PATENT DOCUMENTS

| | | | |
|---|---|---|---|
| 2015/0172626 A1* | 6/2015 | Martini | G06T 7/0008 348/50 |
| 2016/0084960 A1* | 3/2016 | Harrison | G01C 3/00 356/4.03 |
| 2018/0168740 A1* | 6/2018 | Ryan | A61B 1/317 |
| 2018/0211404 A1* | 7/2018 | Zhu | G06T 7/70 |
| 2019/0228263 A1* | 7/2019 | Szeto | G06T 19/006 |
| 2019/0236790 A1* | 8/2019 | Khan | G06T 7/215 |

OTHER PUBLICATIONS

Chaouch: "A New Descriptor for 2D Depth Image Indexing and 3D Model Retrieval", IEEE, 2007, pp. 373-376. (Year: 2007).*
Nate Hagbi "Shape Recognition and Pose Estimation for Mobile Augmented Reality", IEEE, 2009, pp. 65-71. (Year: 2009).*

\* cited by examiner

*Primary Examiner* — Wei Wen Yang
(74) *Attorney, Agent, or Firm* — Fenwick & West LLP

(57) ABSTRACT

A system tracks poses of a passive object using fiducial markers on fiducial surfaces of a polygonal structure of the object using image data captured by a camera. The system includes an object tracking controller that generates an estimated pose for a frame of the image data using an approximate pose estimation (APE), and then updates the estimated pose using a dense pose refinement (DPR) of pixels. The APE may include minimizing reprojection error between projected image points of the fiducial markers and observed image points of the fiducial markers in the frame. The DPR may include minimizing appearance error between image pixels of the fiducial markers in the frame and projected model pixels of the fiducial markers determined from the estimated pose and the object model. In some embodiments, an inter-frame corner tracking (ICT) of the fiducial markers may be used to facilitate the APE.

20 Claims, 14 Drawing Sheets

300

```
┌─────────────────────────────────────────────────────────────────┐
│ Determine an object model of an object including a polygonal   │
│ structure at a first end and a tip at a second end, the        │
│ polygonal structure having fiducial surfaces each              │
│ including a fiducial marker                                    │
│ 305                                                            │
└─────────────────────────────────────────────────────────────────┘
                              │
┌─────────────────────────────────────────────────────────────────┐
│ Receive image data of the object from a camera                 │
│ 310                                                            │
└─────────────────────────────────────────────────────────────────┘
                              │
┌─────────────────────────────────────────────────────────────────┐
│ Determine an estimated pose of the polygonal structure using   │
│ approximate pose estimation (APE)                              │
│ 315                                                            │
└─────────────────────────────────────────────────────────────────┘
                              │
                      < APE successful? >
                    NO       320          YES
                     │                     │
┌──────────────────────────────────────────┐│
│ Determine the estimated pose of the      ││
│ polygonal structure using inter-frame    ││
│ corner tracking (ICT)                    ││
│ 325                                      ││
└──────────────────────────────────────────┘│
                              │
┌─────────────────────────────────────────────────────────────────┐
│ Normalize fiducial marker intensity                            │
│ 330                                                            │
└─────────────────────────────────────────────────────────────────┘
                              │
┌─────────────────────────────────────────────────────────────────┐
│ Determine a pose of the polygonal structure using dense pose   │
│ refinement (DPR) on the estimated pose                         │
│ 335                                                            │
└─────────────────────────────────────────────────────────────────┘
                              │
┌─────────────────────────────────────────────────────────────────┐
│ Determine a spatial location of the tip of the object from the │
│ pose of the polygonal structure                                │
│ 340                                                            │
└─────────────────────────────────────────────────────────────────┘
                              │
┌─────────────────────────────────────────────────────────────────┐
│ Determine an image drawn by the tip of the object on a surface │
│ based on the spatial location of the tip                       │
│ 345                                                            │
└─────────────────────────────────────────────────────────────────┘
```

Determine observed image points of one or more fiducial markers in a frame of image data captured by the camera
405

Determine spatial locations of one or more fiducial markers from the observed image points
410

Determine projected image points of the one or more fiducial markers in the frame based on the spatial locations of the one or more fiducial markers
416

Determine reprojection error between the projected image points and the observed image points
420

Determine an estimated pose of the polygonal structure by minimizing the reprojection error
425

Determine motion samples from spatial locations fiducial markers across multiple frames of the image data
505

Determine an aggregate motion sample of the fiducial markers across the multiple frames of the image data from the motion samples of the fiducial markers
510

Update the aggregate motion sample by removing spatial locations of fiducial markers that are incompatible with the aggregate motion sample
515

Determine a spatial location of a fiducial marker for a frame based on the updated aggregate motion sample
520

Determine an estimated pose of the polygonal structure for the frame using approximate pose estimation (APE) with the spatial locations of the at least a portion of the fiducial markers
525

```
┌─────────────────────────────────────────────────────────────────────────┐
│ Determine observed pixels of fiducial markers in a frame of image data  │
│                         captured by a camera                            │
│                                   605                                   │
└─────────────────────────────────────────────────────────────────────────┘
                                      │
┌─────────────────────────────────────────────────────────────────────────┐
│ Determine projected model pixels of the fiducial markers in the frame   │
│              using the estimated pose and the object model              │
│                                   610                                   │
└─────────────────────────────────────────────────────────────────────────┘
                                      │
┌─────────────────────────────────────────────────────────────────────────┐
│ Determine appearance error between the image pixels of the fiducial     │
│        markers and the projected model pixels of the fiducial markers   │
│                                   615                                   │
└─────────────────────────────────────────────────────────────────────────┘
                                      │
┌─────────────────────────────────────────────────────────────────────────┐
│  Determine the pose of the polygonal structure by minimizing the        │
│                         appearance error                                │
│                                   620                                   │
└─────────────────────────────────────────────────────────────────────────┘
```

PASSIVE OBJECT TRACKING USING CAMERA

BACKGROUND

The present disclosure generally relates to computer object tracking, and specifically relates spatial location tracking of a passive object with a single camera.

Computing devices may use a stylus or other object to facilitate user inputs. To facilitate tracking of the location the stylus with high accuracy, the stylus may be an active object including electrical components such as sensors, emitters, circuitry, wiring, power supply, etc. These electrical components produce data that can be processed by tracking systems to extract positional information of the stylus, but increase the weight, cost and complexity of the stylus. Furthermore, tracking systems that rely on active objects are ineffective at tracking passive objects.

SUMMARY

Techniques for tracking a passive object using image data captured by a single camera are discussed herein. Some embodiments include a system including a camera and an object tracking controller. The camera generates frames of image data of the object. The object includes a polygonal structure at a first end and a tip at a second end opposite the first end. The polygonal structure includes fiducial surfaces, each fiducial surface including a fiducial marker. The object tracking controller receives a frame of the image data of the object from the camera, and performs an approximate pose estimation (APE) based on fiducial marker comparisons. The APE may include determining an estimated pose of the of the polygonal structure in the frame based on minimizing reprojection error between projected image points of the fiducial markers and observed image points of the fiducial markers in the frame. The projected image points are determined from spatial locations of the fiducial markers determined from the observed image points. The object tracking controller performs a dense pose refinement (DPR) of the estimated pose based on pixel comparisons. The DPR may include determining a pose of the polygonal structure by minimizing appearance error between image pixels of the fiducial markers in the frame and projected model pixels of the fiducial markers determined from the estimated pose and an object model of the object. The object tracking controlling determines a spatial location of the tip of the object from the pose of the polygonal structure and the object model.

In some embodiments, the object tracking controller determines whether less than a predefined number of fiducial markers of the polygonal structure are identified in the frame, and in response to determining that less than the predefined number of fiducial markers are identified in the frame, applies inter-frame corner (ICT) tracking of the polygonal structure across multiple frames of the image data to determine observed image points of at least a portion of the fiducial markers to facilitate the APE.

Some embodiments include an object to facilitate location tracking of the object with image data captured by a single camera. The object includes a polygonal structure including at least twelve sides, at least a portion of the sides being fiducial surfaces each including a fiducial marker. Each fiducial marker includes a border region having multiple corners and a first color (e.g., black), and a pattern region having a second color (e.g., white) in the border region. In some embodiments, the object is stylus having a body portion including a first side and a second side. A tip of the stylus is at the first side and the polygonal structure is at the second side. In some embodiments, the polygonal structure has a dodecahedron shape.

BRIEF DESCRIPTION OF THE DRAWINGS

FIG. 3 is a flow chart of a process for tracking an object having a polygonal structure with a camera, in accordance with some embodiments.

FIG. 4 is a flow chart of a process for determining an estimated pose of the polygonal structure of the object using an approximate pose estimation (APE), in accordance with some embodiments, FIG. 5 is a flow chart of a process for determining spatial locations of fiducial markers in a frame using inter-frame corner tracking (ICT), in accordance with some embodiments.

FIG. 6 is a flow chart of a process for determining a pose of the polygonal structure using dense pose refinement (DPR) of the estimated pose, in accordance with some embodiments.

Figure 1:
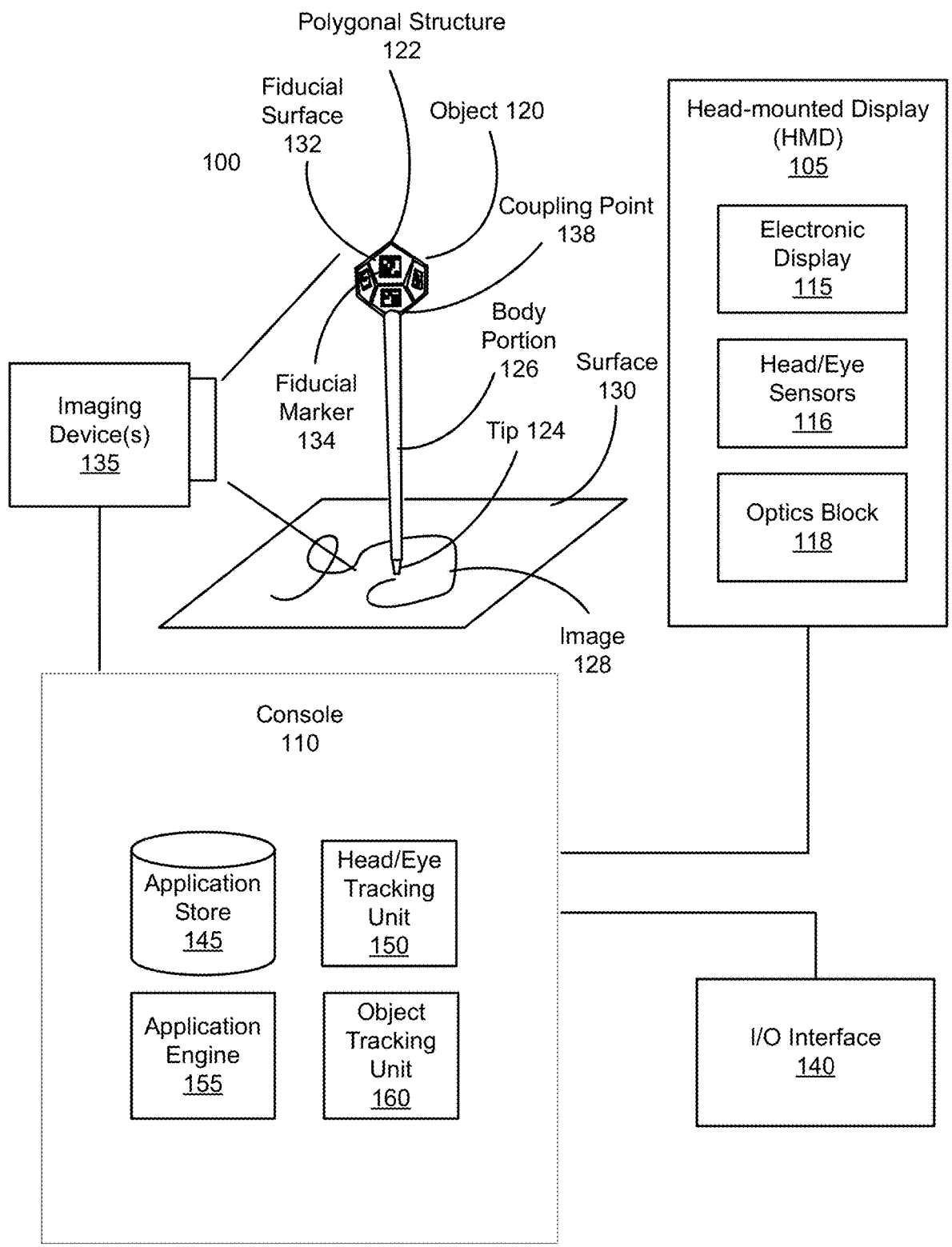
FIG. 1 is a block diagram of a head-mounted display system, in accordance with some embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Some embodiments provide for passive object tracking with a single camera. The object includes or is attached with a polygonal structure, such as a 12 sided dodecahedron. Each of the sides or "fiducial surfaces," as used herein, includes a fiducial marker that can be captured by the camera and programmatically recognized. The shape of polygonal structure facilitates capture of multiple fiducial markers in each frame to facilitate tracking of the pose of the polygonal structure. An object tracking controller receives a frame of the image data of the object from the camera, and performs an approximate pose estimation (APE) based on fiducial marker comparisons. The APE may include determining an estimated pose of the of the polygonal structure in the frame based on minimizing reprojection error between projected image points of the fiducial markers and observed image points of the fiducial markers in the frame. The projected image points are determined from spatial locations of the fiducial markers determined from the observed image points. In some embodiments, when fewer than a predefined (e.g., 2) number of fiducial markers are recognized in the frame, the object tracking controller performs an inter-frame corner tracking across to identify spatial locations of fiducial markers to facilitate the APE. Subsequent to the APE, the object tracking controller updates the estimated pose using a dense pose refinement (DPR). The DPR includes performing on pixel comparisons to identify the pose of the polygonal structure and the object. In some embodiments, the object is a passive stylus that includes the polygonal structure and a tip. The pose of the polygonal structure is used to track the location of the tip, such as for a writing or drawing application.

System Overview

FIG. 1 is a block diagram of an artificial reality system 100, in accordance some embodiment. The system 100 comprises a head-mounted display (HMD) 105, one or more imaging devices 135, and an input/output (I/O) interface 140 that are each coupled to a console 110. While FIG. 1 shows an example system 100 including one HMD 105, one imaging device 135, and one I/O interface 140, in other embodiments, any number of these components are included in the system 100. For example, system 100 may include multiple HMDs 105 each having an associated I/O interface 140 and being monitored by one or more imaging devices 135, with each HMD 105, I/O interface 140, and imaging device 135 communicating with the console 110. In alternative configurations, different and/or additional components may be included in the system 100.

The system 100 further includes an object 120. The imaging device 135, which may be a camera, generates image data of the object 120, and provides the image data to an object tracking unit 160 of the console 110 for tracking of the pose of the object 120. The pose of the object 120 refers to the position and orientation of the object 120, such as a 6 degree-of-freedom (DoF) pose. The object 120 includes a polygonal structure 122 that facilitates programmatic pose determination with a single imaging device 135. In the example of FIG. 1, the object 120 is a passive stylus including the polygonal structure 122 at a first end, and a tip 124 at a second end opposite the first end, and a body portion 126 between the polygonal structure 122 and the tip 124. The polygonal structure 122 includes multiple fiducial surfaces 132, each fiducial surface including a different fiducial marker 134. The polygonal structure 122 in FIG. 1 is a dodecahedron that allows multiple fiducial makers 143 to be visible in the frames of the image data captured by the imaging device 135, providing information used in accurate fiducial marker identification and pose determination for the object 120. The object tracked by in the system 100 is not limited to a passive stylus, and may be some other object attached with the polygonal structure 122. In some embodiments, the polygonal structure 122 includes a coupling point 138 that attaches with the other portions of the object. For the object 122, the coupling point may be an aperture in which the body portion 126 is attached.

Each of the fiducial markers 134 may be a binary square marker having a design that is visually distinguished from other fiducial markers 134 to facilitate image recognition. In some embodiments, each fiducial marker 134 has a square, black border region and white inner regions in the black border region.

As discussed in greater detail below in connection with FIGS. 2 through 6, the object tracking unit 160 may use a model-based tracking with a calibrated object model and a combination of approximate pose estimation (APE) and dense pose refinement (DPR) to determine the pose of the polygonal structure 122 of the object 120. The object tracking unit 160 determines a spatial location of the tip 124 based on the pose of the polygonal structure 122, such as by projecting the tip 124 from the polygonal structure 122 according to the object model. Using spatial locations of the tip 124 extracted from multiple frames of the image data captured by the imaging device 135, the object tracking unit 160 determines an image 126 drawn by the tip 124 of the object on a surface 128. The surface 128 may be an actual surface, or may be a virtual surface. Among other advantages, the polygonal structure 122 allows a passive object to be tracked with six degree-of-freedom (DoF) using a monocular camera. The object may be passive because it does not require electronic sensing components to achieve the spatial location tracking. Thus, the object can be free of electrical components such as an inertial measurement sensor, magnetometer, camera, light emitting diode (LE) marker, laser scanner, battery, wiring, etc.

As discussed above, the polygonal structure 120 has a dodecahedron shape including twelve fiducial surfaces 132. The body portion 126 extends into or is otherwise attached with one of the fiducial surfaces 132. The remaining fiducial surfaces 132 may each include a fiducial marker 132. In other embodiments, the polygonal structure 120 can include other polygonal shapes with different numbers of fiducial surfaces. Furthermore, the object 120 is not limited to being a stylus. For example, a polygonal structure 122 may be attached with other types of objects to facilitate pose determination from image frames of the object captured by the imaging device 135.

The HMD 105 presents content to a user. Examples of content presented by the HMD 105 include one or more images, video, audio, or some combination thereof. In some embodiments, audio is presented via an external device (e.g., speakers and/or headphones) that receives audio information from the HMD 105, the console 110, or both, and presents audio data based on the audio information. In some embodiments, the content presented by the HMD may include the object 120, or an avatar or virtual representation of the object 120. The presentation of the object within the content may correspond with the pose (e.g., including orientation and location) of the object as determined by the object tracking unit 160.

The HMD 105 includes an electronic display 115, head/eye sensors 116, and optics block 118. The head/eye sensors 116 are configured to detect the position of the user's head and/or eyes. For example, the head/eye sensors 116 may include one or more cameras that capture images of the user's eyes, and/or one or more position sensors that capture the position of the user's head (e.g., accelerometer). Various types of sensors can be used. The electronic display 115 displays images to the user in accordance with data received from the console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The optics block 118 magnifies received image light from the electronic display 115, corrects optical errors associated with the image light, and presents the corrected image light to a user of the HMD 105. In an embodiment, the optics block 118 includes one or more optical elements and/or combinations of different optical elements. For example, an optical element is an aperture, a Fresnel lens, a convex lens, a concave lens, a filter, or any other suitable optical element that affects the image light emitted from the electronic display 115. In some embodiments, one or more of the optical elements in the optics block 118 may have one or more coatings, such as anti-reflective coatings.

The one or more imaging devices 135 are configured to generate image data for components of the system 100. For example, one imaging device 135 may be directed at the object 120 to capture frames of image data including the object 120. The imaging device 135 may be located in various positions, such as on a desk defining the surface 130. In another example, one or more imaging devices 135 capture images of a user's hand to facilitate user hand tracking. In another example, the one or more imaging devices 135 may capture image data of the HMD 105 to facilitate position tracking for the HMD 105 on the user's head. In various embodiments, the system 100 may include one or more imaging devices 135. In some embodiments, the imaging device 135 may include a color cameras, such as a RGB color camera and/or a global shutter camera. A single camera can result in a high degree of object tracking accuracy, such as sub-millimeter accuracy, when the object includes a polygonal structure 122, and when used in connection with approximate pose estimation and dense pose refinement processes by the object tracking unit 160. Furthermore, use of a single camera avoids complications associated with calibration or recalibration of multiple cameras.

In some embodiments, one or more of the imaging device 135 may include a depth camera. The depth camera may include a light sensor, a structured light (e.g., infrared) emitter, and a controller. The structured light emitter projects a light pattern a region of interest. The light pattern, for example, may include a known speckle pattern. The light (e.g., infrared) sensor is pointed region of interest, and captures the projected light pattern on objects in the region. The controller controls the operations of the light sensor and structured light emitter. The controller is further configured to generate depth image data based on input from the light sensor. In some embodiments, depth image data may be used in connection with image data from a camera to determine the pose of the object 120.

In some embodiments, one or more imaging devices 135 are attached to the HMD 105. For example, an imaging device 135 may be pointed to the front of the HMD 105 to capture a first person perspective of the user. When the user's hand and/or the object 120 is within the field of view, the imaging device 135 captures image data of the object 120 in the user's hand from a first person perspective. The imaging device 135 on the HMD 105 may be a single camera of a single camera imaging system, or may be a camera of a multi-camera imaging system. For the multi-camera imaging system, image data from the imaging device 135 on the HMD 105 may be included in image data sets with image data from the other imaging devices 135 located elsewhere.

The I/O interface 140 is a device that allows a user to send action requests to the console 110. An action request is a request to perform a particular action. For example, an action request may be to start or end an application or to perform a particular action within the application. The I/O input interface 140 may include one or more input devices. Example input devices include: a keyboard, a mouse, a game controller, electronic gloves, or any other suitable device for receiving action requests and communicating the received action requests to the console 110. An action request received by the I/O interface 140 is communicated to the console 110, which performs an action corresponding to the action request. In some embodiments, the I/O input interface 140 may provide haptic feedback to the user in accordance with instructions received from the console 110. For example, haptic feedback is provided when an action request is received, or the console 110 communicates instructions to the I/O input interface 140 causing the I/O input interface 140 to generate haptic feedback when the console 110 performs an action.

The HMD system 100 uses an imaging device 135 to capture image data of the object 120. The object tracking unit 160 derives poses of the object 120 from the image data, and the poses are used as inputs to the console 110. For example, tracking of the object 120 may be used to provide 2D or 3D drawing, general object manipulation, game interactions, user interface navigation, application control, web browser control, etc. In some embodiments, the I/O interface 140 is omitted from the system 100.

The console 110 provides content to the HMD 105 for presentation to a user in accordance with information received from one or more of: the imaging device 135, the HMD 105, and the I/O interface 140. In the example shown in FIG. 1, the console 110 includes an application store 145, a head/eye tracking unit 150, an application engine 155, and a hand tracking unit 160. Some embodiments of the console 110 have different modules than those described in conjunction with FIG. 1. Similarly, the functions further described below may be distributed among components of the console 110 in a different manner than is described here. For example, the object tracking unit 160 may be located in the HMD 105.

The application store 145 stores one or more applications for execution by the console 110. An application is a group of instructions, that when executed by a processor, generates content for presentation to the user. Content generated by an application may be in response to inputs received from the user via movement of the HMD 105, the object 120, or the I/O interface device 140. Examples of applications include: gaming applications, conferencing applications, video playback application, or other suitable applications. The head/eye tracking unit 150 communicates with the head/eye sensors 116 of the HMD 105, and determines the positions of the user's head and eyes. In some embodiments, head/eye tracking unit 150 calibrates the system 100 using one or more calibration parameters and may adjust one or more calibration parameters to reduce error in determination of the head or eye positions of the HMD 105. The head/eye tracking unit 150 provides the head or eye positions to the application engine 155.

The application engine 155 executes applications within the system 100. The application engine 155 may receive user hand pose inputs from the hand tracking unit 160, as well as head and/or eye position inputs from the head/eye tracking unit 150. Based on the received information, the application engine 155 determines content to provide to the HMD 105 for presentation to the user. Additionally, the application engine 155 performs an action within an application executing on the console 110 in response to an action request received from the I/O interface 140 or as determined from object tracking, and provides feedback to the user that the action was performed. For example, the provided feedback includes visual or audible feedback via the HMD 105 or haptic feedback via the I/O interface 140.

Figure 2:
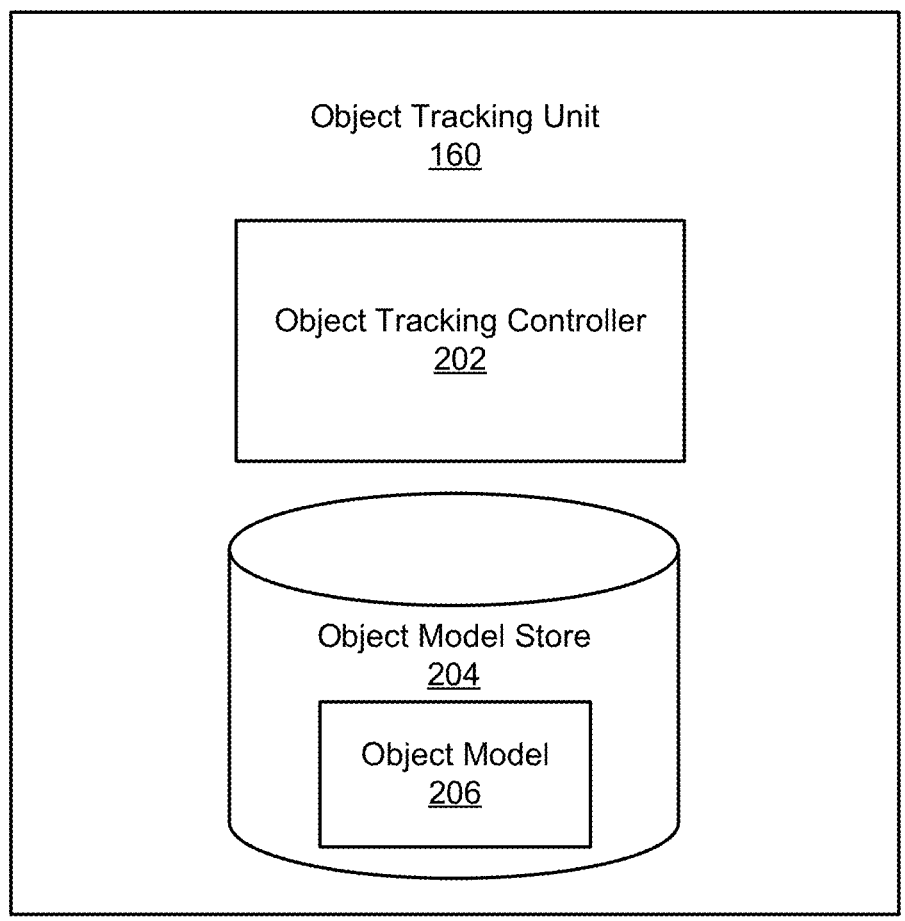
FIG. 2 is an example of an object tracking unit, in accordance with some embodiments.

FIG. 2 is a block diagram of the object tracking unit 160, in accordance with some embodiments. The object tracking unit 160 includes an object tracking controller 202 and an object model store 204. Some embodiments of the object tracking unit 160 may have different components than those described here. Similarly, the functions can be distributed among the components in a different manner than is described here. The object tracking controller 202 performs the processing functionality discussed herein with respect to determining the pose of the object 120 from image data. For example, the object tracking controller 202 receives frames of image data from a camera or other imaging device 135, and performs an approximate pose estimation (APE) to generate an estimated pose in a frame by tracking the spatial locations of fiducial markers based on their appearance in the frame. If less than a predefined number of fiducial markers are identified in the frame, the object tracking controller 202 uses an inter-frame tracking (ICT) to generate spatial locations of fiducial markers in the frame which are applied to the APE in the frame. The estimated pose is then updated using a dense pose refinement (DPR) of pixel comparisons. Here, the object tracking controller determines observed pixels of the fiducial markers in the frame, determines projected model pixels of the fiducials markers generated using the estimated pose and the object model, determines appearance error between the image pixels and the projected model pixels, and determines the pose of the polygonal structure 122 by minimizing the appearance error. Additional details regarding object tracking are discussed below in connection with FIGS. 3 through 6.

The object model store 204 is a memory storing the object model 206 of the object 120. The object model 206 may be represented by a dense surface model, such as a triangle mesh defined by points having locations in an object space. For the object 120, the surfaces of the polygonal structure 122, body portion 126, and tip 124 may be defined by a collection of points X each represented by a vector in the object space.

As discussed above, the object 120 may be a static object, such as a static stylus. The object 120 does not require electronics, light emitting diodes (LEDs), threading wires, lasers, active illumination, or charging batteries to achieve reliable pose tracking. The object 120 may be any other object that is attached with a polygonal structure that is to be tracked in an artificial reality environment.

Passive Object Tracking

FIG. 3 is a flow chart of a process 300 for tracking an object 120 having a polygonal structure 122 with a camera, in accordance with some embodiments. In one embodiment, the process of FIG. 3 is performed by the system 100. Other entities may perform some or all of the steps of the process in other embodiments. Likewise, embodiments may include different and/or additional steps, or perform the steps in different orders.

The process 300 provides for determination of the pose of the object 120. Given a target object $O_t$ represented by the object model 206 and an image frame $I_c$ captured by the camera, the object tracking controller 202 of the object tracking unit 160 determines a 6 DoF pose p of the object $O_t$ in the image space of the camera. A set of reference points X of the object model 206 in object space may be defined by Equation 1:

$$X_i = [x_i, y_i, z_i] \quad (1)$$

where i is an index value for the points, and where n defines the number of points in the object model. Here, each point $X_i$ is a vector having an X, Y, and Z coordinate represented by $x_i$, $y_i$, and $z_i$ respectively.

A set of corresponding reference points U in the corresponding 2D image space of the camera may be defined by Equation 2:

$$U_i = [u_i, v_i]^T \quad (2)$$

where i is the index value for the n points of the object model.

The relationship between the reference points X and U may be obtained using camera projection as defined by Equation 3:

$$U_i(p) \equiv U_i(R, t) = Proj\left([R | t]\begin{pmatrix} x_i \\ y_i \\ z_i \\ 1 \end{pmatrix}\right) \quad (3)$$

where $R \in SO(3)$ is an object rotation matrix, $t \in R^3$ is a translation vector, p is the pose of the object, and Proj( ) is the projection operator of the camera. The pose p of the object 120 may be defined as a 6D vector including the 3D axis-angle representation of R and the 3D translation vector t.

With reference to the process 300 in FIG. 3, the system 100 determines 305 (e.g., via the object tracking controller 202 of the object tracking unit 160) an object model 206 of the object 120 including a polygonal structure 122 at a first end and a tip 124 at a second end. The polygonal 122 structure has fiducial surfaces 132 including fiducial markers 134. The object 120 is discussed herein as a passive stylus, but in some embodiments, the object is a passive object other than a stylus that includes the polygonal structure 122. The polygonal structure 122 may be made using any suitable technique. In some embodiments, the polygonal structure 122 is made from a 3D printer, or from a mold. The fiducial markers 134 may be printed onto a media, and the media is affixed to each of the fiducial surfaces 132. The object model 206 may be stored at the object model store 204, and accessed by the object tracking controller 202 to track the pose of the object 122. In some embodiments, the object model is defined by the set of reference points X in object space as shown above in Equation 1.

In some embodiments, the object tracking controller 202 calibrates the object model 206 for the polygonal structure 122 using a bundle adjustment. Depending on the manufacturing process used for the polygonal structure 122, the positions of the fiducial markers 134 may vary, or there may be misalignment of a fiducial marker, or some other type of variance. Thus, a calibration may be used to determine the precise pose of each fiducial marker 134 with respect to the polygonal structure 122. For the polygonal structure 122 having the dodecahedron shape, the dodecahedron may be defined by pj. Multiple image frames of the dodecahedron are captured (e.g., 24 images) and applied to minimize an error with respect to both poses $p_j$ of the fiducial markers 143, and dodecahedron poses $p_k$ with respect to the camera as defined by Equation 4:

$$E_a(\{p_j, p_k\}) = \Sigma i \Sigma j \Sigma k (I_c(U_i(p_j, p_k)) - O_i(X_i))^2 \qquad (4).$$

In some embodiments, the poses of one of the fiducial markers 134 is fixed and adjust other marker and dodecahedron poses simultaneously using Gauss-Newton iteration. The poses $p_j$ of the fiducial markers may be initialized to their ideal positions on the dodecahedron, and the camera poses $p_k$ may be initialized using an approximate pose estimation (APE).

The system 100 (e.g., the object tracking controller 202) receives 310 image data of the object 122 from a camera, such as an imaging device 135. A user may hold the object 122 within view of the camera, and move the object 122. The image data may include frames that capture views of the object 122 as the object 122 moves over time. In some embodiments, the object captured in the image data is defined by the set of reference points U in the 2D image space as shown above in Equation 2.

The system 100 (e.g., the object tracking controller 202) determines 315 an estimated pose of the polygonal structure 122 using approximate pose estimation (APE). An estimated pose may be determined for each frame of the image data. As discussed above and shown in Equation 3, the pose p may define a 6 DoF position and orientation of the polygonal structure 122 in space. To determine the estimated pose, the object tracking controller 202 may apply a perspective-n-point (PnP) algorithm to minimize a reprojection error between the projected image points of the fiducial markers 134 and observed image points of the fiducial markers in the frame. Additional details regarding the APE are discussed below in connection with the process 400 and FIG. 4.

The system 100 (e.g., the object tracking controller 202) determines 320 whether the approximate pose estimation was successful. The approximate pose estimation may be determined as unsuccessful when less than a threshold number of fiducial markers 134 are identified and located in the frame of the image data. In some embodiments, at least two fiducial markers 134 must be successfully identified for the approximate pose estimation to be successful. The approximate pose estimation may fail because of various reasons, such as motion blur or because several of the fiducial markers 134 are tiled in the fame of the image data. Similarly, if two or more fiducial markers are identified and located in the frame, then the approximate pose estimation is more reliable, and may be determined as successful.

In response to determining that the approximate pose estimation is unsuccessful, the system 100 (e.g., the object tracking controller 202) determines 325 the estimated pose of the polygonal structure 122 using inter-frame corner tracking (ICT). The inter-frame corner tracking provides additional fiducial marker spatial positions that can be used as constraints for the PnP algorithm of APE. In some embodiments, a pyramidal Lucas-Kanade marker corner tracking can be used to track corners of the fiducial makers 134 across multiple frames of the image data, and the tracked corners across multiple frames may be used to determine the spatial positions of at least a subset of the fiducial markers 134 in the current frame. Additional details regarding inter-frame corner tracking are discussed in connection with the process 500 and FIG. 5.

Subsequent to determining the estimated pose of the polygonal structure 132 using APE and/or ICT, the system 100 (e.g., the object tracking controller 202) normalizes intensity of the identified fiducial markers 134 in the frame of the image data. As discussed above, each of the fiducial markers 134 has a square, black border with a white, inner pattern that identifies the fiducial marker 134. Normalizing intensity of the fiducial makers 134 in the frame of the image data may include setting pixels associated with the white regions of the fiducial markers 134 to the same pixel value, and setting pixels associated with the black regions of the fiducial markers 134 to the same pixel value. In addition to providing intensity invariance for the fiducial markers 134, the normalization minimizes the residual between the object model 206 and frame of image data of the object 120. A primary cause of intensity invariance is caused by the different normal directions of the fiducial surfaces 132, and thus a per marker normalization may be used where groups of pixels corresponding with a fiducial marker 134/fiducial surface 132 may receive the same normalization adjustment, and where different marker 134/fiducial surface 132 pixels may receive different amounts of normalization adjustment.

The system 100 (e.g., the object tracking controller 202) determines 335 a pose of the polygonal structure 122 using dense pose refinement (DPR) on the estimate pose. The estimated pose determined using PnP may be too imprecise or jittery to use in tracking the tip 124 of the object 120. The accuracy of the pose determination may be improved using a dense alignment that minimizes appearance distance between image pixels of points U of the fiducial markers 134 in the image data and the projected model pixels of corresponding points X of the fiducial markers 134 in the object model. In some embodiments, minimizing the appearance distance includes solving a nonlinear least squares problem using a Gauss-Newton iteration. When the Gauss-Newton iteration fails to converge with a fixed step size, a backtracking line search may be used to scale the step size after each Gauss-Newton iteration. In some embodiments, mipmaps of the fiducial markers 134 are used to enable efficient sampling of the points X of the object model 206 at the same scale as the image pixels of U in the image data. Additional details regarding DPR are discussed in connection with the process 600 and FIG. 6.

The system 100 (e.g., the object tracking controller 202) determines 340 a spatial location of the tip 124 of the object 120 from the pose of the polygonal structure 122. In particular, the pose of the polygonal structure 122 is used with the object model 206 to determine the spatial location of the tip 124. The object model 206 defines the relative locations of the tip 124 with respect to the other portions of the object 122 including the polygonal structure 122. For example, one or more of the points X of the object model 206 may correspond with the tip 124, while other points X may correspond with other portions of the object 120 including the polygonal structure 122. Thus, the location of the tip 124 may be derived from applying the object model 206 to the determined pose of the polygonal structure 122.

The system 100 (e.g., the object tracking controller 202) determines 345 an image drawn by the tip 124 of the object 120 on a surface 130 based on the spatial location of the tip 124. For example, steps 305 through 340 may be repeated to determine spatial locations of the tip 124 over time from multiple frames of the image data captured by the camera. The surface may be a 2D surface, such as physical surface and/or a virtual surface of an artificial reality environment presented by the HMD 105. For example, if the spatial positions of the tip 124 are defined by a [X, Y, Z] coordinate system and the surface is defined by an X-Y plane at a particular Z coordinate value, then spatial positions of the tip 124 having the Z coordinate value may be interpreted as points of the image drawn by the tip 124. In some embodiments, the spatial locations of the tip 124 and/or polygonal structure 122 over time may be used to facilitate other types of commands, operations, or inputs to the console 110.

Approximate Pose Estimation (APE)

FIG. 4 is a flow chart of a process 400 for determining an estimated pose of the polygonal structure 122 of the object 120 using an approximate pose estimation (APE), in accordance with some embodiments. The process 400 provides for the APE as discussed at 314 of the process 300 to generate the estimated pose, which may be subsequently refined using the dense pose refinement (DPR) as discussed at 335 of the process 300 and the process 600 shown in FIG. 6. In one embodiment, the process 400 is performed by the system 100. Other entities may perform some or all of the steps of the process in other embodiments. Likewise, embodiments may include different and/or additional steps, or perform the steps in different orders.

The system 100 (e.g., the object tracking controller 202) determines 405 observed image points of one or more fiducial markers 134 in a frame of image data captured by a camera. The observed image points refer to pixel locations in the 2D frame of the image. In some embodiments, the object tracking controller 220 identifies one or more of the fiducial markers 134 in the frame based on the distinctive visual features of the fiducial markers 134. The object tracking controller 220 may further identify the corners of the each of the fiducial markers 134.

In some embodiments, a constant motion acceleration model may be to constrain the search region of the fiducial markers 134 and their corners in the frame of the image data. For example, if a 6 DoF pose of the polygonal structure 122 was successfully determined for a prior frame of the image data, then the search region of pixels in the current frame may be constrained by the pixel location of the polygonal structure 122 in the prior frame. In one example, the search region of the current image frame is larger than the pixel area of the polygonal structure 122 in the prior frame to account for motion. For example, the search region may be four times larger than the pixel area of the polygonal structure a previous frame to account for fast motion. In some embodiments, the object tracking controller 220 begins analyzing the frame by searching within the search region for image points of the fiducial markers 134, and then explores outside of the search region if the polygonal structure 122 and/or at least one search marker 134 is not identified in the search region. Among other things, the speed and efficiency of identification of the fiducial markers 134 is increased by passing over pixel regions unlikely to include the polygonal structure 122 in frames.

The system 100 (e.g., the object tracking controller 202) determines 410 spatial locations of the one or more fiducial markers 134 from the observed image points. For example, the object tracking controller 220 determines the location and orientation of the fiducial markers 134 based on the pixel positions of the corners of the fiducial markers 134 in the frame. In some embodiments, the object tracking controller 220 uses the model 206 which defines the fiducial markers as having a square shape of a particular size. Thus, the observed size and corner offsets from the square of the observed image points may be used to determine the spatial locations of the fiducial markers 134. The spatial locations of each of the fiducial markers 134 determined from the observed image points are sample values that can be fit to the estimated pose.

The system 100 (e.g., the object tracking controller 202) determines 415 projected image points of the one or more fiducial markers 134 in the frame based on the spatial locations of the one or more fiducial markers 134. The projected image points of the fiduciary markers 134 may be generated by projecting the spatial locations of fiducial markers in space onto the 2D image space of the camera.

The system 100 (e.g., the object tracking controller 202) determines 415 reprojection error between the projected image points and the observed image points of the fiducial markers 134. For example, the relationship between the reprojection error $E_r$ and the pose p may be defined by Equation 5:

$$E_r(p) = \frac{1}{n}\sum_{i=1}^{n}(U'_i - U_i(p))^2 \qquad (5)$$

where i is the index value for n fiducial markers, $U'_i$ defines observed image points, and $U_i(p)$ defines projected image points as a function of pose p. Equation 5 defines the $L^2$ difference between the observed image points and the projected image points. In some embodiments, other types of error detection algorithms may be used to define the reprojection error $E_r$.

The system 100 (e.g., the object tracking controller 202) determines 425 an estimated pose of the polygonal structure 122 by minimizing the reprojection error. For example, the reprojection error $E_r$ defined by Equation 5 may be minimized using a damped least squares algorithm, such as the Levenberg-Marquaardt algorithm.

In some embodiments, the projected image points $U_i(p)$ of the pose p and the corresponding observed image points $U'_i$ in the image data each correspond with one of the fiducial markers 134, and i is an index of the fiducial markers 134. This results in a limited number of points that need to be match to determine the estimated pose during the APE, increasing efficiency of the APE. Furthermore, the estimated pose of the APE provides a good estimate when two or more fiducial markers 134 (e.g., and their corners) are identified in the image data, and thus inter-frame corner tracking (ICT) processes can be skipped. In some embodiments, points on the fiducial surfaces 132 of the polygonal structure other than or in addition to the fiducial markers 134 may be used in the APE, such as points associated with features of the fiducial markers. Using additional points can increase the accuracy of the pose estimation, but can also use up more processing resources.

Inter-Frame Corner Tracking

FIG. 5 is a flow chart of a process for determining spatial locations of fiducial markers in a frame using inter-frame corner tracking (ICT), in accordance with some embodiments. The process 500 provides for the inter-frame corner tracking as discussed at 325 of the process 300, which may be performed when the approximate pose estimation (APE) fails because less than a threshold number (e.g., two) of fiducial markers 134 are successfully identified in the current frame of the image data. In one embodiment, the process 500 is performed by the system 100. Other entities may perform some or all of the steps of the process in other embodiments. Likewise, embodiments may include different and/or additional steps, or perform the steps in different orders.

The system 100 (e.g., the object tracking controller 202) determines 505 motion samples from spatial locations of fiducial markers 134 across multiple frames of image data. For example, when fewer than two fiducial markers 134 are successfully identified in the current frame, the object tracking controller 202 may analyze prior frames, and use a pyramidal Lucas-Kanade to track the corners of the fiducial markers 134 of the polygonal structure 122 from frame to frame, and determine spatial locations of the fiducial markers 143 from frame to frame.

The system 100 (e.g., the object tracking controller 202) determines 510 an aggregate motion sample of the fiducial markers 134 across the multiple frames of the image data from the motion samples of the fiducial markers 134. The aggregate motion sample refers to a global motion of the fiducial markers 134. The global motion may be based on the spatial locations of the fiducial markers as determined from each of the frames.

The system 100 (e.g., the object tracking controller 202) updates 515 the aggregate sample by removing fiducial markers 134 that are incompatible with the aggregate motion sample. For example, outliers whose motion is dissimilar to the motion of other fiducial markers 134 may be excluded to generate the filtered motion samples.

The system 100 (e.g., the object tracking controller 202) determines 520 a spatial location of a fiducial marker 134 for a frame based on the filtered motion sample. The ICT in process 500 can be used to provide additional spatial locations for fiducial markers 134 that are not successfully identified in the initial APE process at step 304 of the process 300 in FIG. 3.

The system 100 (e.g., the object tracking controller 202) determines 525 the estimated pose of the polygonal structure 122 using approximate pose estimation (APE) with the spatial locations of one or more fiducial markers 134 determined using the inter-frame corner tracking (ICT). For example, the spatial location of the fiducial marker 134 may be used to determine projected image points $U_i$, and then applied to determine the reprojection error and the estimated pose as discussed in steps 416 through 425 of the process 400 in FIG. 4.

Dense Pose Refinement (DPR)

FIG. 6 is a flow chart of a process 600 for determining a pose of the polygonal structure using dense pose refinement (DPR) of an estimated pose, in accordance with some embodiments. The process 600 provides for the dense pose refinement as discussed at 335 of the process 300 after the estimated pose of the polygonal structure 122 has been determined using APE. In one embodiment, the process 600 is performed by the system 100. Other entities may perform some or all of the steps of the process in other embodiments. Likewise, embodiments may include different and/or additional steps, or perform the steps in different orders.

The system 100 (e.g., the object tracking controller 202) determines 605 observed pixels of fiducial markers 134 in a frame of image data captured by the camera. The discussion at 405 of the process 400 may be applicable at 605. The observed pixels of the fiducial markers 134 include pixels values corresponding with each the fiducial markers 134. Furthermore, the observed pixel values of the fiducial markers 134 in the frame of image data may be normalized as discussed at 330 of the process 300.

The system 100 (e.g., the object tracking controller 202) determines 610 projected model pixels of the fiducial markers 134 in the frame using the estimated pose and the object model 206. The projected model pixels of the fiduciary markers 134 refer to pixels generated by projecting the points X of the fiducial markers 134 in the object space of the object model 206 onto the 2D image space of the camera according to the estimated pose as determined using the approximate pose estimation (APE). In some embodiments, the projected model pixels of the fiducial markers 134 are generated from mipmaps of the fiducial markers 134. A mipmap of a fiducial marker includes a set of different image representations of the fiducial marker 134, such as at different sizes and resolutions. The mipmaps of each fiducial marker 134 may be selected based on pixel size correspondence with the observed pixels of fiducial markers 134.

In some embodiments, the projected model pixels of the fiducial markers 134 are generated by sampling according to the size of the fiducial markers 134 in the frame of image data. For example, each of the fiducial markers 134 may be represented by mipmaps. The mipmaps for each fiducial marker 134 may include a range from low resolution and small size image representations to high resolution and large size image representations of the fiducial marker 134. The object tracking controller 220 selects a mipmap for each of the fiducial markers 134 according to the pixel size of the observed pixels of the fiducial markers 134 in the image data.

The system 100 (e.g., the object tracking controller 202) determines 615 appearance error between the image pixels of the fiducial markers 134 and the projected model pixels of the fiducial markers 134. For example, the relationship between the appearance error $E_a$ and the pose p may be defined by Equation 6:

$$E_a(p) = \frac{1}{n}\sum_{i=1}^{n}(I_c(U_i(p)) - 0_t(X_i))^2 \tag{6}$$

where i is the index value for the n points, $O_t$ defines the projected model pixels of the reference point $X_i$, $X_i$ defines the reference points of the object model are visible in the frame, and $I_c(U_i(p))$ defines the image pixels as a function of projected points $U_i(p)$ of the pose p. Other types of error detection algorithms may also be used to define the appearance error $E_a$.

The system 100 (e.g., the object tracking controller 202) determines 620 the pose of the polygonal structure 122 by minimizing the appearance error. For example, the appearance error $E_a$ defined by Equation 6 defines a nonlinear least squares problem that can be solved using Gauss-Newton iteration. In some embodiments, a first-order Taylor series approximation may be used to approximate how the image changes with respect to pose as defined by Equation 7:

$$\Delta p_{best} = \frac{\text{argmin}}{\Delta p} \frac{1}{n}\sum_{i=1}^{n}(I_c(U_i(p' + \Delta p)) - O_t(X_i))^2 \tag{7}$$

$$\approx \underset{\Delta p}{\operatorname{argmin}} \frac{1}{n} \sum_{i=1}^{n} \left( I_c(U_i(p')) + \frac{dI_c}{dp}\bigg|_{p'} \Delta p - O_t(X_i) \right)^2.$$

To solve for Δp in each iteration, the first derivative in Equation 8 is set to zero to result in a system of linear equations defined by Equation 8.

$$J_c \Delta p = O_t - I_c \qquad (8)$$

where $O_t$ and $I_c$ are vector forms of $O_t(X_i)$ and $I_c(U_i)$ respectively as defined in Equation 7, and $J_c$ is the jacobian matrix of $I_c$ with respect to p as computed by the chain rule. The pose p is a 6D vector including the 3D axis-angle representation of the rotation matrix R and the 3D translation vector t, as defined in Equation 3 above.

A QR decomposition may be used to solve for Δp Equation 8. Because the least squares problem is nonlinear, Gauss-Newton iteration does not always converge with a fixed step size. In some embodiments, a backtracking line search is used to scale the step size by α after each iteration of solving the Equation 8. Δp may be shrunk by Δp=αp until the Armijo-Goldstein condition is met as defined by Equation 9:

$$E_a(p+\Delta p) \leq E_a(p) + c \nabla E_a(p)^T \Delta p \qquad (9)$$

where $\nabla E_a(p)$ is the local gradient function. In some embodiments, c is set to $10^{-4}$ and α is set to 0.5 using empirical techniques.

In some embodiments, there may be portions of the fiducial markers 134 that do not significantly contribute to the error term, such as in regions of uniform intensity where $\nabla I_c(U_i)=0$, and thus $$\frac{dI_c}{dp} = 0.$$

Thus, regions or me projected model pixels of the mipmaps may be deactivated by selectively masking out flat regions, dropping regions where $\nabla O_t(X_i)=0$, and hence where $\nabla I_c(U_i)$ is likely to be zero as well. Masking portions of the projected model pixels increases the speed of the dense pose refinement without comprising tracking quality.

Pose Tracking Example

Figure 7:
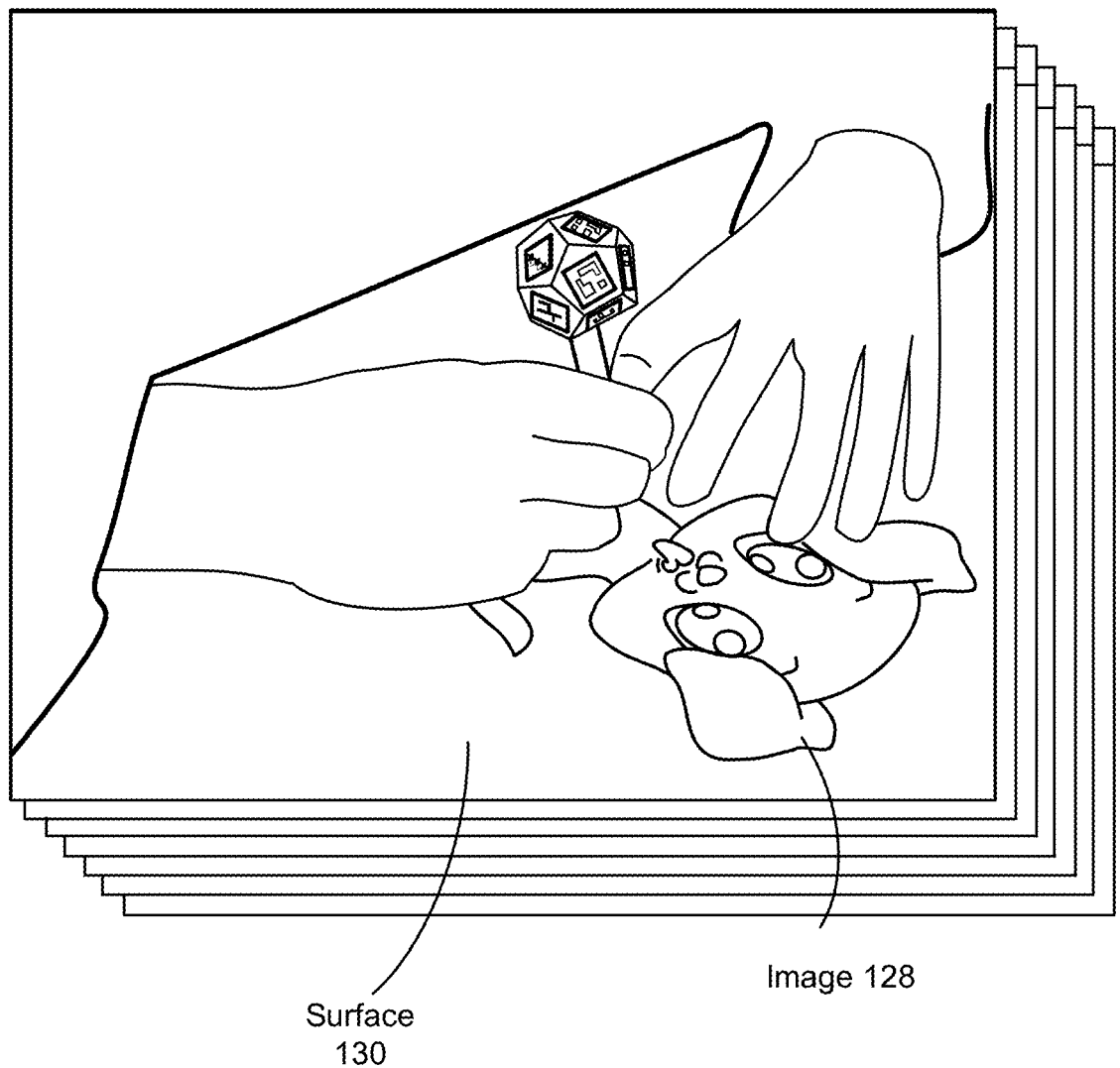
FIG. 7 shows frames of image data of an object including a polygonal structure, in accordance with some embodiments.

FIG. 7 shows frames of image data 700 of an object 122 including a polygonal structure 122, in accordance with some embodiments. The image data 700 captured by the camera or other imaging device 135 may include a sequence of frames, each frame being an image defined by pixels with pixel values. The object tracking unit 160 may determine a pose of the polygonal structure 122 in each frame to track the motion of the object 122 across the multiple frames of the image data 700 over time. Furthermore, the frame shown in FIG. 7 includes a user drawing an image 128 on the surface 130 with the object 122, here a passive stylus.

Figure 8:
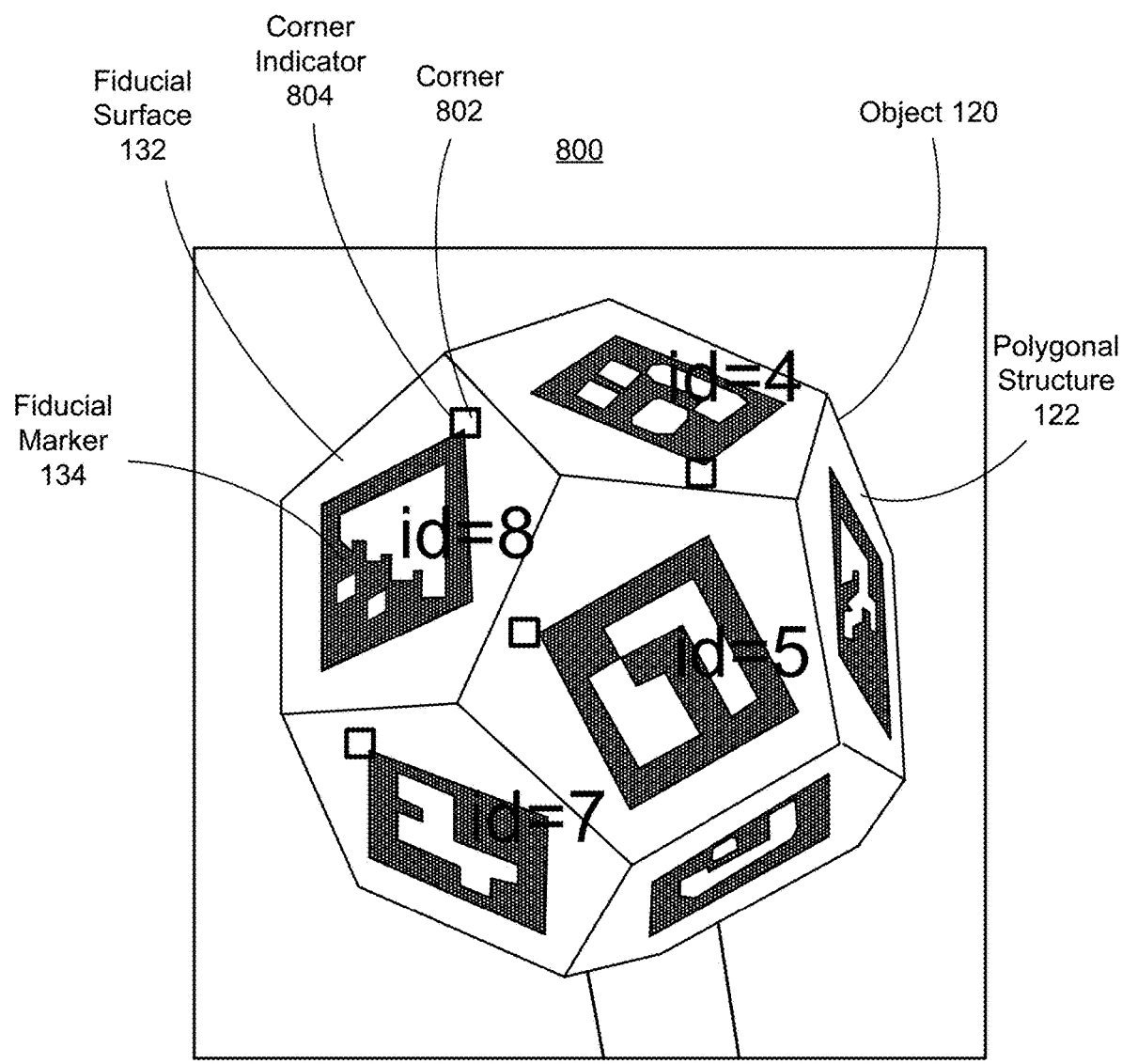
FIG. 8 shows a portion of a frame of image data processed using approximate pose estimation (APE), in accordance with some embodiments.

FIG. 8 shows a portion of a frame 800 of the image data 700 processed using approximate pose estimation (APE), in accordance with some embodiments. The frame 800 shows the fiducial markers 134 on the fiducial surfaces 132 of the polygonal structure 122 of the object 120. The object tracking unit 160 may be configured to operate in a test or debug mode that visually enhances the frame 800 according to the results of the APE as discussed in the process 400 of FIG. 4. Here, the APE process has identified four of the fiducial markers 134 having identifiers (id) of 4, 5, 7, 8. The polygonal structure 122 is a dodecahedron with each fiducial marker 134 being associated with a different identifier. Furthermore, a corner 802 of each fiducial marker 134 is marked with a corner indicator 804 to show accurate corner identification of the fiducial markers 134.

Figure 9:
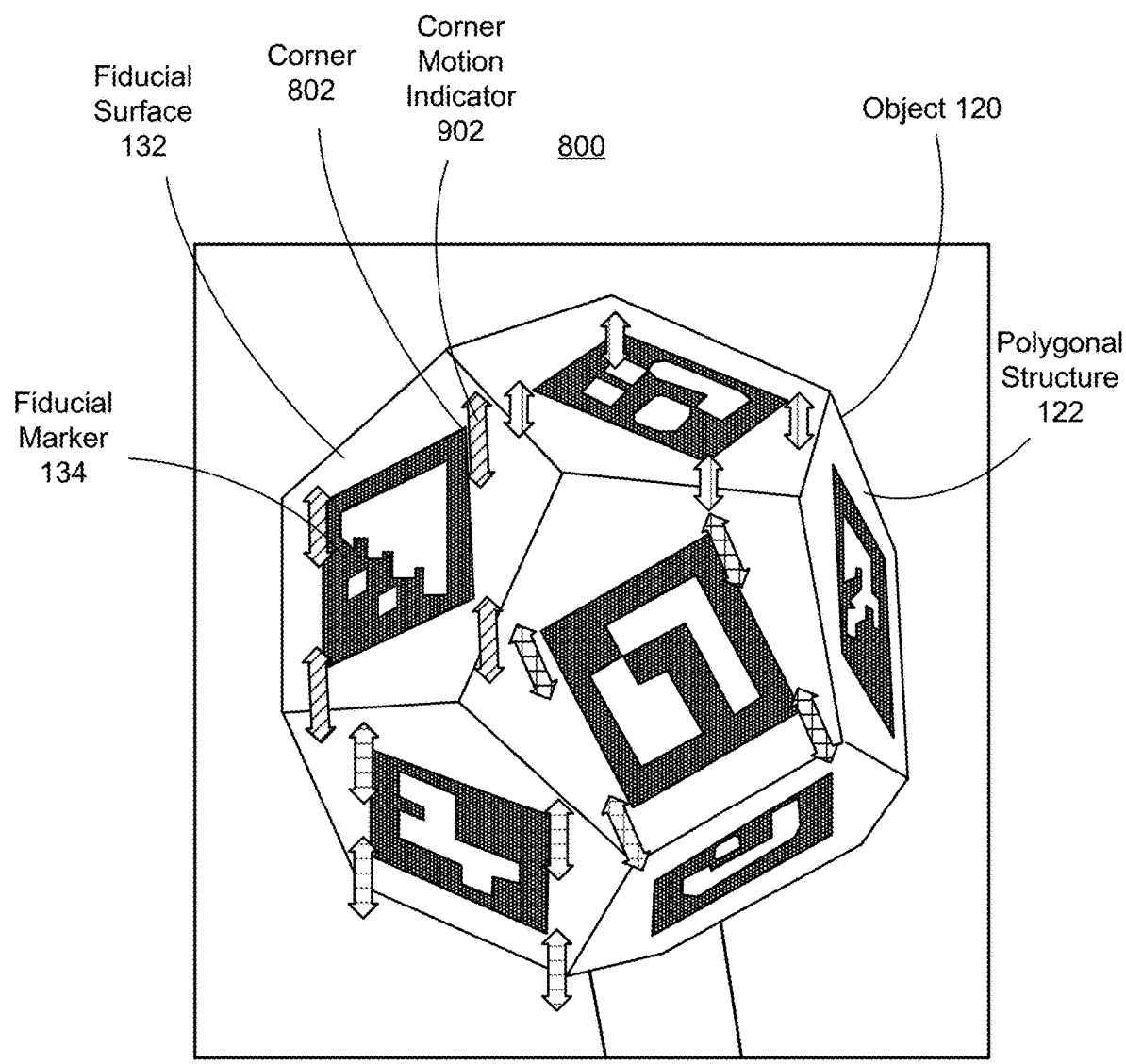
FIG. 9 shows a portion of a frame of image data processed using inter-frame corner tracking (ITC), in accordance with some embodiments.

FIG. 9 shows a portion of a frame 800 of the image data 700 processed using inter-frame corner tracking (ITC), in accordance with some embodiments. The object tracking unit 160 may be configured to operate in a test or debug mode that visually enhances the frame 800 according to the results of the ICT as discussed in the process 500 of FIG. 5. Here, a motion sample of each corner is determined from tracking the corner across multiple prior frames of the image data 700. The motion sample of the corner 802 is shown by the corner motion indicator 902 in the current frame 800.

Figure 10:
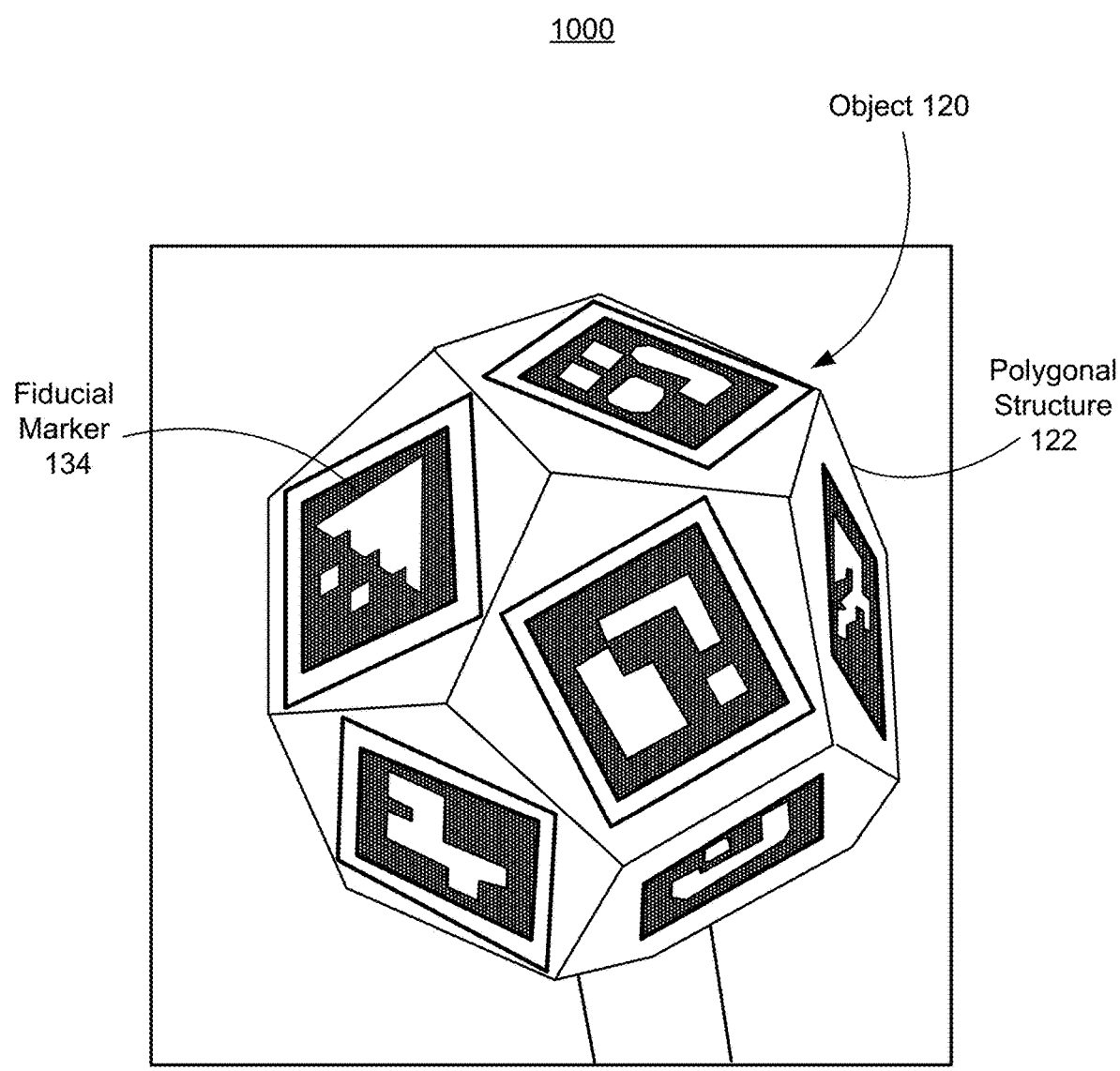
FIG. 10 shows a normalized frame generated from a frame of image data, in accordance with some embodiments.

FIG. 10 shows a normalized frame 1000 generated from the frame 800 of the image data 700, in accordance with some embodiments. The intensity of the pixel values of the fiducial markers 134 may be normalized to facilitate pixel value comparisons in the dense pose refinement (DPR). In some embodiments, pixels around the border of the fiducial markers 134 are also normalized. The normalized pixel values of the fiducial markers may be used as the observed pixels of the fiducial markers 134 in the DPR as discussed at 605 of the process 600 shown in FIG. 6.

Figure 11:
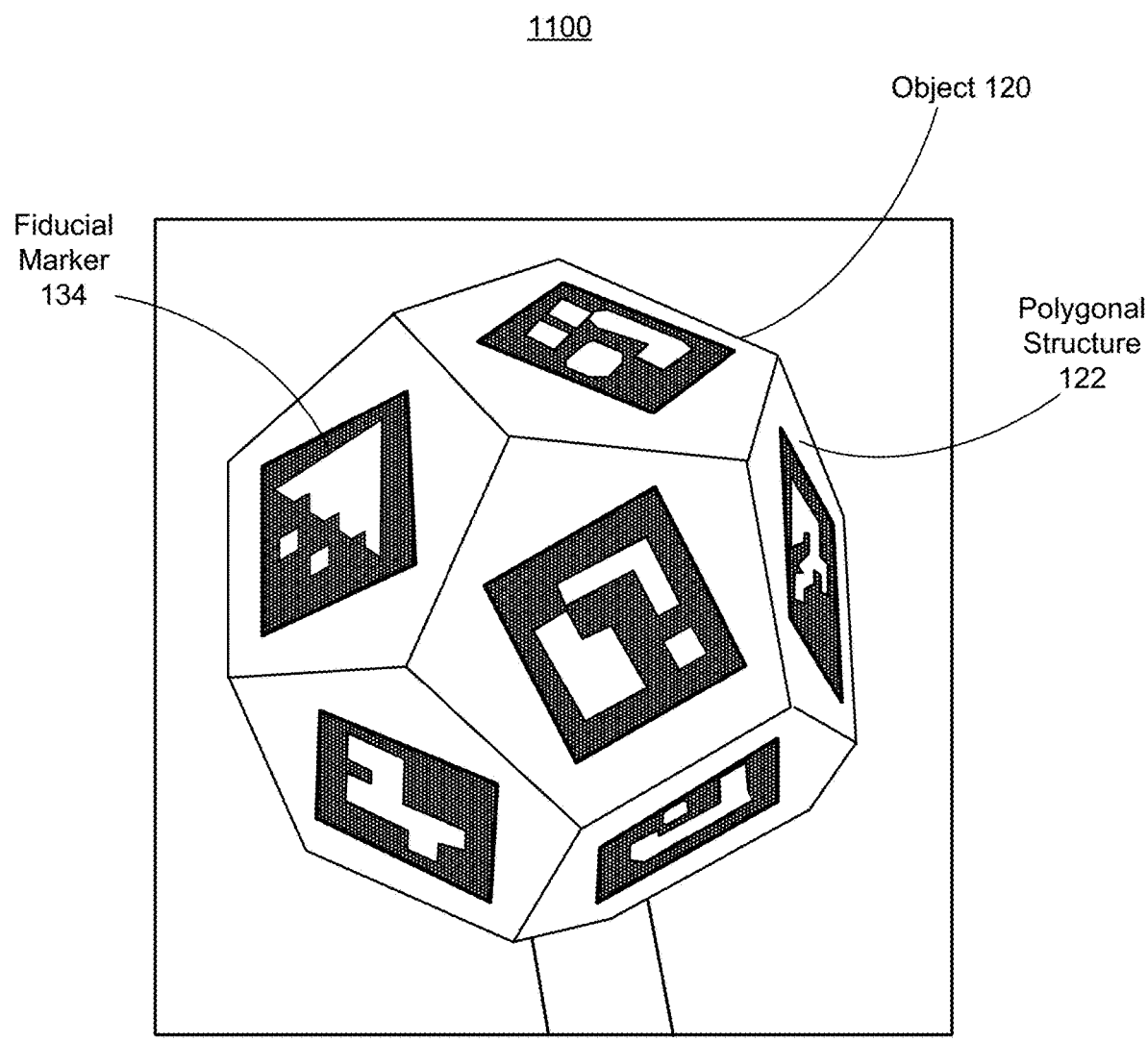
FIG. 11 shows projected model pixels generated from an estimated pose and an object model, in accordance with some embodiments.

FIG. 11 shows projected model pixels 1100 generated from the estimated pose and the object model, in accordance with some embodiments. The projected model pixels 1100 include pixels values for each of the fiducial markers 134, and may be generated by projecting the points of the object model 206 in object space onto the 2D image space of the camera as discussed at 610 of the process 600 in shown in FIG. 6. In FIG. 11, projected model pixels of multiple fiducial markers 134 have been aggregated into an image corresponding with the normalized frame 1000. In some embodiments, the projected model pixels 1100 are generated from mipmaps of each of the fiducial markers 134.

Figure 12:
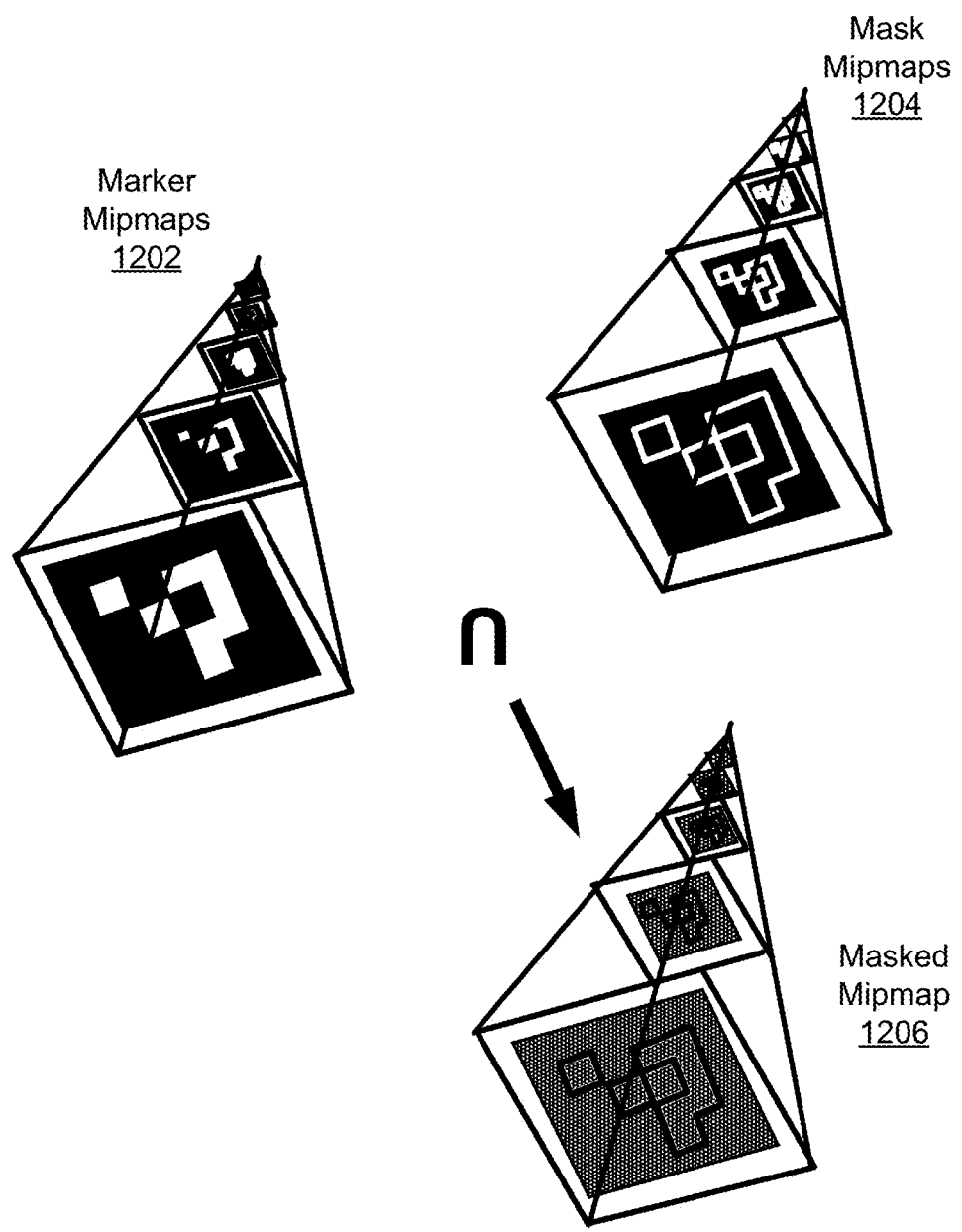
FIG. 12 shows mipmaps of a fiducial marker, in accordance with some embodiments.

FIG. 12 shows mipmaps 1200 of a fiducial marker 134, in accordance with some embodiments. Each fiducial marker in the object model 206 may be associated with a set of mipmaps of different size and resolution, as shown by the mipmaps 1202, 1204, or 1206. As discussed above at step 620 of the process 600, portions of the mipmaps may be deactivated by selectively masking out flat regions, dropping regions where $\nabla O_t(X_i)=0$, and hence where $\nabla I_c(U_i)$ is likely to be zero as well. The white and black regions of the marker mipmaps 1202 represent the active and non-active regions, respectively, of the fiducial marker 134. The mask mipmaps 1204 may be generated from the gradient of the marker mipmaps 1202, and defines in black the non-edge regions and in white edge regions of the marker mipmaps 1202. The masked mipmaps 1206 includes gray regions representing deactivated regions of the fiducial marker 134 (e.g., where $\nabla O_t(X_i)=0$), and may be generated by combining each of the marker mipmap 1202 with a corresponding mask mipmap 1204.

Figure 13:
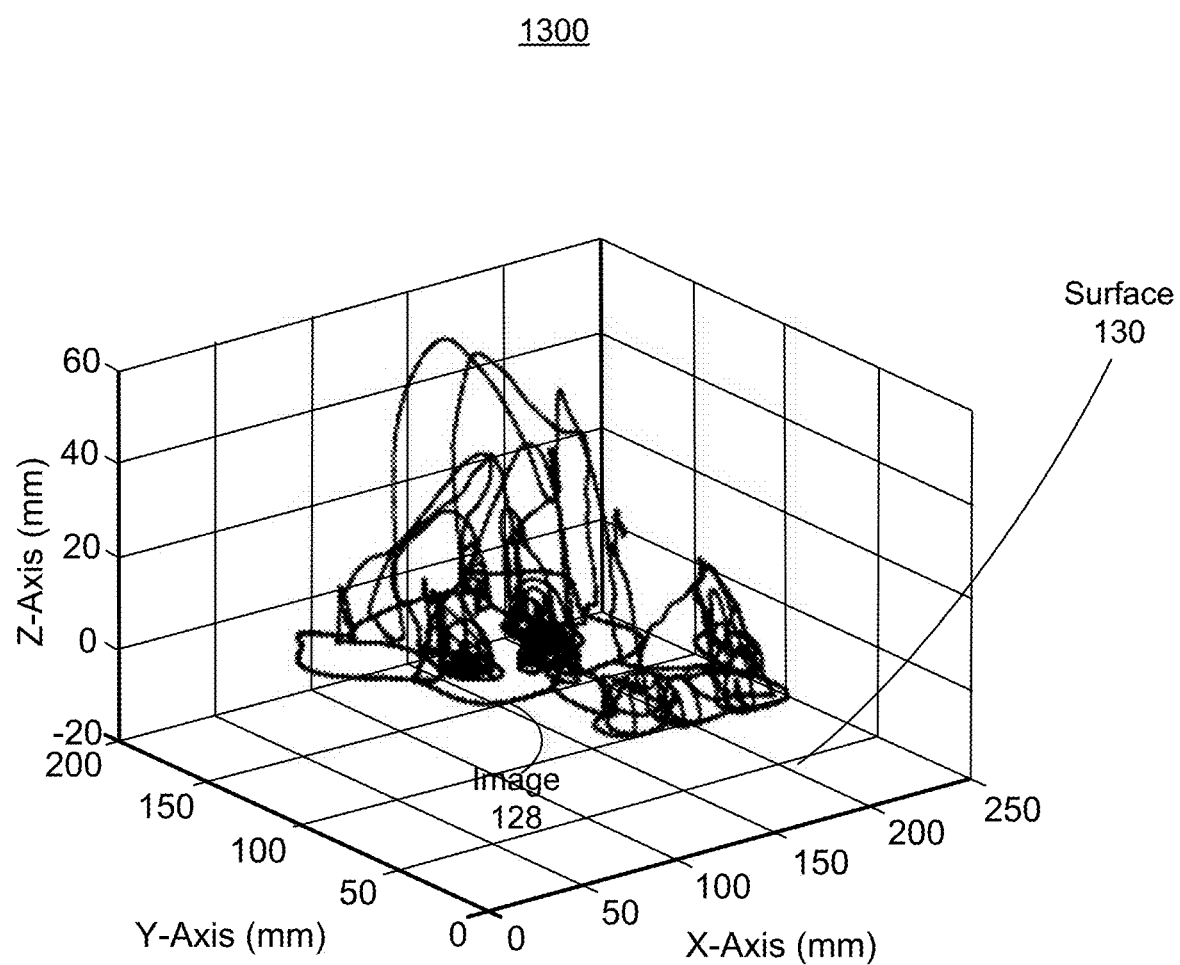
FIG. 13 shows a graph of tracked spatial locations of the tip of the object, in accordance with some embodiments.

FIG. 13 shows a graph 1300 of tracked spatial locations of the tip 124 of the object 122, in accordance with some embodiments. The spatial locations of the tip 124 are defined with reference to X, Y, and Z axes. As discussed above, the spatial locations of the tip 124 are generated by tracking the pose of the polygonal structure 122 over time through multiple frames of image data generated by the camera, and projecting from the object model 206 the location of the tip 124 in each from the pose of the polygonal structure 122. In this example, the Z axis value of −20 defines a surface 130 in the X-Y plane on which the image 128 is drawn using the tip 124. Returning to FIG. 13, spatial locations that are above the −20 Z axis value are determined to be lift offs from the drawing surface 130. The surface 120 is not limited to being in the X-Y axis, and in some embodiments, drawings may be performed on 3 dimensional surfaces. A surface may be an artificial reality surface, such as in a VR system, or may be an actual surface enhanced by artificial reality, such as in an AR system that interacts with user manipulation of a passive stylus object 120 on a desk. The polygonal structure 122 is not necessarily attached to a stylus, and may be attached to other types of objects. Furthermore, the type of inputs that may be generated based on tracking the pose of the polygonal structure 122 with a single camera is not limited to writing or drawing.

Figure 14:
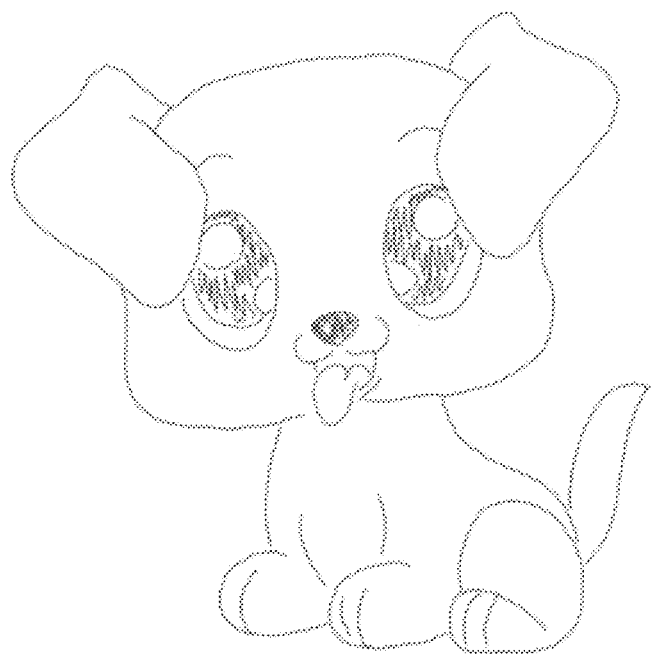
FIG. 14 shows a top view of an image generated from the tracked spatial locations of the tip of the object shown in the graph of FIG. 13, in accordance with some embodiments.

FIG. 14 shows a top view of the image 128 generated from the tracked spatial locations of the tip 124 of the object 122 shown in the graph 1300, in accordance with some embodiments. The spatial locations of the tip 124 having the Z=−20 value are collected to form the image 128, while other spatial locations of the tip 124 are discarded.

Additional Configuration Considerations

The foregoing descriptions of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system, comprising:
a camera configured to generate image data of an object, the object including a polygonal structure at a first end and a tip at a second end opposite the first end, the polygonal structure including fiducial surfaces, each fiducial surface including a fiducial marker; and
an object tracking controller, configured to:
receive a frame of the image data of the object from the camera;
determine an estimated pose of the of the polygonal structure in the frame based on minimizing reprojection error between a first number of projected image points for each of the fiducial markers in the frame and the first number of observed image points for each of the fiducial markers in the frame, the projected image points determined from spatial locations of the fiducial markers determined from the observed image points;
determine a pose of the polygonal structure by minimizing appearance error between a second number of image pixels for each of the fiducial markers in the frame and the second number of projected model pixels for each of the fiducial markers in the frame, the projected model pixels generated using the estimated pose and an object model of the object, the second number being larger than the first number; and
determine a spatial location of the tip of the object from the pose of the polygonal structure and the object model.

2. The system of claim 1, wherein the object tracking controller is further configured to:
determine spatial locations of the tip of the object over time from multiple frames of the image data captured by the camera; and
determine an image drawn by the tip of the object on a surface based on the spatial locations of the tip over time.

3. The system of claim 1, wherein the object tracking controller is further configured to:
determine the observed image points of the fiducial markers in the frame;
determine the spatial locations of the fiducial markers from the observed image points based on locations of corners of the fiducial markers in the frame;
determine the projected image points of the fiducial markers based on the spatial locations of the fiducial markers;
determine the reprojection error between the projected image points and the observed image points; and
minimize the reprojection error to determine the estimated pose.

4. The system of claim 1, wherein the object tracking controller is configured to:
determine a search region in the frame based on second image pixels of the fiducial markers in a prior frame of the image data; and
search within the search region to determine the observed image points of the fiducial markers in the frame.

5. The system of claim 3, wherein the object tracking controller is further configured to:
determine that less than a predefined number of fiducial markers of the polygonal structure are identified in the frame; and
in response to determining that less than the predefined number of fiducial markers are identified in the frame, apply inter-frame corner tracking of the polygonal structure across multiple frames of the image data to determine observed image points of at least a portion of the fiducial markers.

6. The system of claim 5, wherein the object tracking controller is further configured to:
determine motion samples of the fiducial markers from spatial locations of the fiducial markers across the multiple frames of the image data;
determine an aggregate motion sample of the fiducial markers across the multiple frames of the image data from the motion samples of the fiducial markers;
update the aggregate motion sample by removing spatial locations of fiducial markers that are incompatible with the aggregate motion sample; and
determine observed image points of the at least a portion of the fiducial markers based on the updated aggregate motion sample.

7. The method of claim 1, wherein object tracking controller is further configured to normalize intensity of the image pixels of the fiducial markers in the frame prior to minimizing the appearance error.

8. The system of claim 1, wherein the object tracking controller is further configured to apply a Gauss Newton iteration and a backtracking line search to minimize the appearance error between the second number of image pixels of the fiducial markers in the frame and the second number of projected model pixels of the fiducial markers determined from the estimated pose and the object model.

9. The system of claim 1, wherein the object tracking controller is configured to generate the projected model pixels using mipmaps of the fiducial markers, the projected model pixels of each fiducial marker being generated based on a mipmap from a set of mipmaps corresponding with the fiducial marker, the mipmap selected according to pixel size of the image pixels of the fiducial markers in the frame.

10. The system of claim 9, wherein a portion of the mipmap is masked.

11. The system of claim 1, wherein the object tracking controller is further configured to calibrate the object model using a bundle adjustment to determine relative positions of the fiducial markers and the polygonal structure in the object.

12. The system of claim 1, wherein the object model defines the polygonal structure including a dodecahedron shape, at least a portion of the surfaces of the dodecahedron shape being a fiducial surface including a fiducial marker.

13. A system, comprising:
an object tracking controller, configured to:
receive a frame of image data of an object captured by a camera, the object including a polygonal structure at a first end and a tip at a second end opposite the first end, the polygonal structure including fiducial surfaces, each fiducial surface including a fiducial marker;
determine an estimated pose of the of the polygonal structure in the frame based on minimizing reprojection error between a first number of projected image points for each of the fiducial markers in the frame and the first number of observed image points for each of the fiducial markers in the frame, the projected image points determined from spatial locations of the fiducial markers determined from the observed image points;
determine a pose of the polygonal structure by minimizing appearance error between a second number of image pixels for each of the fiducial markers in the frame and the second number of projected model pixels for each of the fiducial markers in the frame, the projected model pixels generated using the estimated pose and an object model of the object, the second number being larger than the first number; and
determine a spatial location of the tip of the object from the pose of the polygonal structure and the object model.

14. The system of claim 13, wherein the object tracking controller is further configured to:
determine the observed image points of the fiducial markers in the frame;
determine the spatial locations of the fiducial markers from the observed image points based on locations of corners of the fiducial markers in the frame;
determine the projected image points of the fiducial markers based on the spatial locations of the fiducial markers;
determine the reprojection error between the projected image points and the observed image points; and
minimize the reprojection error to determine the estimated pose.

15. The system of claim 13, wherein the object tracking controller is further configured to:
determine that less than a predefined number of fiducial markers of the polygonal structure are identified in the frame; and
in response to determining that less than the predefined number of fiducial markers are identified in the frame:
determine motion samples of the fiducial markers from spatial locations of the fiducial markers across multiple frames of the image data;
determine an aggregate motion sample of the fiducial markers across the multiple frames of the image data from the motion samples of the fiducial markers;
update the aggregate motion sample by removing spatial locations of fiducial markers that are incompatible with the aggregate motion sample; and
determine observed image points of the at least a portion of the fiducial markers based on the updated aggregate motion sample.

16. The system of claim 13, wherein the object tracking controller is further configured to apply a Gauss Newton iteration and a backtracking line search to minimize the appearance error between the second number of image pixels of the fiducial markers in the frame and the second number of projected model pixels of the fiducial markers determined from the estimated pose and the object model.

17. The system of claim 13, wherein the object tracking controller is configured to generate the projected model pixels using mipmaps of the fiducial markers, the projected model pixels of each fiducial marker being generated based on a mipmap from a set of mipmaps corresponding with the fiducial marker, the mipmap selected according to pixel size of the image pixels of the fiducial markers in the frame.

18. A method, comprising, by one or more processors:
   receiving a frame of image data of an object from a camera, the object including a polygonal structure at a first end and a tip at a second end opposite the first end, the polygonal structure including fiducial surfaces, each fiducial surface including a fiducial marker;
   determining an estimated pose of the of the polygonal structure in the frame based on minimizing reprojection error between a first number of projected image points for each of the fiducial markers in the frame and the first number of observed image points for each of the fiducial markers in the frame, the projected image points determined from spatial locations of the fiducial markers determined from the observed image points;
   determining a pose of the polygonal structure by minimizing appearance error between a second number of image pixels for each of the fiducial markers in the frame and the second number of projected model pixels for each of the fiducial markers in the frame, the projected model pixels generated using the estimated pose and an object model of the object, the second number being larger than the first number; and
   determine a spatial location of the tip of the object from the pose of the polygonal structure and the object model.

19. The method of claim 18, further comprising, by the one or more processors:
   determining the observed image points of the fiducial markers in the frame;
   determining the spatial locations of the fiducial markers from the observed image points based on locations of corners of the fiducial markers in the frame;
   determining the projected image points of the fiducial markers based on the spatial locations of the fiducial markers;
   determining the reprojection error between the projected image points and the observed image points; and
   minimizing the reprojection error to determine the estimated pose.

20. The method of claim 18, further comprising, by the one or more processors:
   determining a search region in the frame based on second image pixels of the fiducial markers in a prior frame of the image data; and
   searching within the search region to determine the observed image points of the fiducial markers in the frame.

* * * * *

UNITED STATES PATENT AND TRADEMARK OFFICE
CERTIFICATE OF CORRECTION

PATENT NO. : 10,719,953 B1
APPLICATION NO. : 15/937766
DATED : July 21, 2020
INVENTOR(S) : Ye et al.

Page 1 of 1

It is certified that error appears in the above-identified patent and that said Letters Patent is hereby corrected as shown below:

In the Claims

In Column 18, in Claim 1, Line 25, after "pose" delete "of the".

In Column 20, in Claim 13, Line 4, after "pose" delete "of the".

In Column 21, in Claim 18, Line 12, after "pose" delete "of the".

Signed and Sealed this
Twenty-third Day of March, 2021

Drew Hirshfeld
*Performing the Functions and Duties of the
Under Secretary of Commerce for Intellectual Property and
Director of the United States Patent and Trademark Office*